US006683951B1

(12) United States Patent
Getchell

(10) Patent No.: US 6,683,951 B1
(45) Date of Patent: Jan. 27, 2004

(54) METHOD AND APPARATUS FOR PROVIDING SERVICE TO VODSL DERIVED TELEPHONE LINES DURING POWER INTERRUPTIONS

(75) Inventor: Wayne Raymond Getchell, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/394,324

(22) Filed: Sep. 13, 1999

(51) Int. Cl.[7] .......................... H04M 1/00; H04M 1/24; H04M 3/08; H04M 3/22
(52) U.S. Cl. ................. 379/413.02; 379/9.05; 379/9.06; 379/28; 379/395.01; 379/413
(58) Field of Search .................. 379/1.01, 2, 9.05, 379/32.01, 33, 93.05, 93.06, 93.09, 322, 377, 395.01, 399.01, 413, 413.02, 413.04, 9.06, 413.03

(56) References Cited

U.S. PATENT DOCUMENTS

| 4,381,427 A | 4/1983 | Cheal et al. ............. 179/2 DP |
| 4,685,129 A | 8/1987 | Gavrilovich ................. 379/324 |
| 4,730,311 A | 3/1988 | Carse et al. ............. 370/110.1 |
| 5,848,150 A | 12/1998 | Bingel ......................... 379/399 |
| 5,883,941 A | * 3/1999 | Akers ....................... 379/93.08 |
| 5,909,445 A | 6/1999 | Schneider .................. 370/468 |
| 5,943,404 A | * 8/1999 | Sansom et al. ........... 379/93.06 |
| 6,141,356 A | * 10/2000 | Gorman ...................... 370/493 |
| 6,272,209 B1 | * 8/2001 | Bridger et al. ............... 379/27 |
| 6,282,204 B1 | * 8/2001 | Balatoni et al. ............. 370/421 |
| 6,301,340 B1 | * 10/2001 | Sansom et al. ........... 379/93.06 |
| 6,347,075 B1 | * 2/2002 | Barzegar et al. ............ 370/228 |
| 6,400,803 B1 | * 6/2002 | Tate et al. ................ 379/27.06 |
| 6,466,573 B1 | * 10/2002 | Renucci ....................... 370/352 |
| 6,480,748 B1 | * 11/2002 | Gerszberg et al. ............ 700/21 |
| 6,510,204 B2 | * 1/2003 | De Clercq et al. ............ 379/28 |

FOREIGN PATENT DOCUMENTS

| EP | 0984312 a1 | * 8/2000 | .......... H04M/19/08 |
| GB | 2313979 A | * 12/1997 | .......... H04M/11/06 |
| WO | WO 01/89262 A2 | * 11/2001 | .......... H04Q/11/04 |

* cited by examiner

Primary Examiner—Binh Tieu
(74) Attorney, Agent, or Firm—Max R. Wood; Ogilvy Renault

(57) ABSTRACT

An apparatus and method for maintaining access to lifeline services through telephone sets provided with telephone service from a voice over digital subscriber loop (VoDSL) transceiver during power interruptions are described. All telephone sets associated with the transceiver are connected to a wire loop which supports the VoDSL service in the event of a power interruption to the transceiver. The advantage is the economical provision of lifeline service access to all telephone sets when power is interrupted to the transceiver. Thus, confusion is reduced, safety is enhanced, and access to lifeline services is ensured during emergency situations.

23 Claims, 2 Drawing Sheets

METHOD AND APPARATUS FOR PROVIDING SERVICE TO VODSL DERIVED TELEPHONE LINES DURING POWER INTERRUPTIONS

TECHNICAL FIELD

This invention relates to the provision of telephone services at a customer premises over a wideband service channel and, in particular, to a method and apparatus for maintaining access to telephone services during power outages at the customer's premises on telephone sets connected to voice over digital subscriber loop (VoDSL) derived telephone lines.

BACKGROUND OF THE INVENTION

In the art of telephony, until relatively recently twisted pair copper loops have been used to provide a physical connection for single directory number terminations on the Public Switched Telephone Network (PSTN). This type of service is known in the art as a Plain Old Telephone Service (POTS) connection and provides a termination to which at least one telephone set is connected.

Recently the telecommunications industry has experienced an increase in the utilisation of telecommunications services which requires more bandwidth for service delivery to customer's premises. One way to deliver increased bandwidth to a customer is to install more local loops between the customer's premises and a servicing central office. Another way is to install higher bandwidth connections, such as optical fibre. However, any solution involving the installation of new infrastructure typically proves to be very costly. Considering the downward pressure on service pricing due to increased competition in the telecommunications market, large capital investments in new infrastructure are generally not practical.

Solutions have been developed for providing increased bandwidth over existing subscriber loops. One successful solution is digital subscriber loop (DSL) service which provides good data transfer rates for customers located in proximity of a central office. Several DSL service protocols have been developed. They include asymmetric (ADSL); symmetric (SDSL), rate adaptive (RADSL) and very high speed (VDSL) which are collectively referred to as "XDSL" services. This technology permits the provision of wide frequency bandwidth which provides a second communications channel over the same twisted pair subscriber loop used for telephone service delivery. Various service applications have been developed and deployed using xDSL technology, of which Internet access is a prime example. xDSL devices installed at a customer location or on the customer premises are respectively referred to as Customer Located Equipment and Customer Premises Equipment (CLE/CPE)

There is an increasing interest in providing multiple telephone line terminations at a customer's premises using xDSL services. This interest is fuelled by, for example, an expanding small business workforce requiring office equipment that uses the PSTN as an interconnection medium; an increase in home-based businesses; and a demand for multiple telephone lines for family use.

The provision and deployment of multiple POTS terminations at the customers premises has to date largely been accommodated by installing multiple local loops between the customer's premises and a servicing central office. The deployment of VoDSL, in which multiple telephone line terminations are derived from the DSL channel, has now enabled multiple telephone lines using a single subscriber loop. However, VoDSL has a disadvantage because during power interruptions the DSL channel derived lines are lost. Consequently, telephones connected to those lines are disabled and offer no access to lifeline services during the power interruption.

In the event of power interruption at the customer's premises, current implementations of VoDSL CLEs/CPEs do not provide a contingency solution for maintaining service on the VoDSL derived lines. Nonetheless, in a VoDSL service offering in which VoDSL derived telephone lines are provided, in the event of power interruption at the customer's premises, the telephone set connected to the wire loop termination remains in service because it is provided with power from the central office. However, the VoDSL derived telephone lines become non-functional and cannot be used to place calls. Consequently, the only way the customer is able to place an emergency call is to find the active telephone set connected to the wire loop termination. This is obviously not a desirable situation.

It is known in the art to provide power to telephone equipment in event of power interruption. U.S. Pat. No. 4,381,427 which issued Apr. 26, 1983 to the Applicant describes a local loop system for providing voice and data communications which enables signalling between a customer's telephone and the central office in the event of power interruption. The system is located at the central office and only provides a return path for a local loop in the event of power interruption. The system is not adapted to maintain access to lifeline services through telephone sets connected to VoDSL derived line terminations because it is not adapted to supply power to the VoDSL CLE/CPE.

U.S. Pat. No. 4,730,311 which issued Mar. 8, 1988 to Carse et al. describes a system in which a battery backup is provided at the customer's premises. There are shortcomings in providing backup power in the event of power interruption at a customer's premises using devices such as un-interruptible power supplies or battery backups. Providing batteries or uninterruptible power supplies significantly increases the cost of the deployed CLE/CPE. Backup power supplies can only operate only for a limited period of time before the batteries employed are exhausted. Furthermore, batteries employed in providing backup power also have a limited operational life, and must be serviced and periodically replaced.

No solution is currently known in which VoDSL equipment provides access to lifeline services from telephone sets connected to VoDSL derived telephone lines in the event of a power interruption to the transceiver. Therefore, there remains a need to provide a method and apparatus in which all telephone sets connected to VoDSL derived telephone lines are enabled to maintain access to lifeline services in the event of a power interruption at the customer's premises.

SUMMARY OF THE INVENTION

It is an object of the invention to provide a method and apparatus which maintains access to lifeline services for telephone sets connected to line terminations derived from a wideband service channel in the event of a power interruption to a transceiver providing the services.

The invention therefore provides a transceiver adapted to maintain access to lifeline services over telephones sharing a physical link with a wire loop termination in the event of a power interruption to the transceiver. If operating power to the transceiver is interrupted, the transceiver is adapted to connect a plurality of telephone interfaces associated with the wideband derived line terminations to the wire loop termination, thereby providing power to the interfaces so that access to lifeline services through all telephone sets associated with the transceiver is maintained.

In accordance with the invention, the transceiver is provided with switchover circuitry. While provided with operating power from the customer's premises, the switchover circuitry decouples the telephone interfaces associated with the wideband derived line terminations from the wire loop termination. In the event of a power interruption, the switchover circuitry couples the telephone interfaces associated with the wideband derived line terminations to the wire loop termination, thereby providing operating power to maintain access to lifeline services to all telephone sets associated with the transceiver.

The switchover circuitry preferably automatically transitions from a first state to a second state when operating power is supplied to the transceiver. In the first state, the switchover circuitry couples the telephone interfaces derived from the wideband derived telephone lines in parallel to the wire loop. This permits outbound calls to be placed from any one of the telephones. In the second state, the switchover circuitry couples the telephone interfaces to respective circuits associated with the wideband derived telephone lines so that normal, multi-line operation is restored.

The switchover circuitry may be, for example, one or more electromechanical relays or solid state relays.

The wideband channel may be, for example, a digital subscriber loop (DSL) service channel such as a voice over digital subscriber loop (VoDSL) service channel.

DETAILED DESCRIPTION OF THE PREFERRED EMBODIMENT

The invention provides a method and apparatus for providing access to lifeline services over telephone lines derived from a wideband channel, such as VoDSL, using a transceiver connected to a wire loop when operating power to the transceiver is interrupted.

Figure 1:
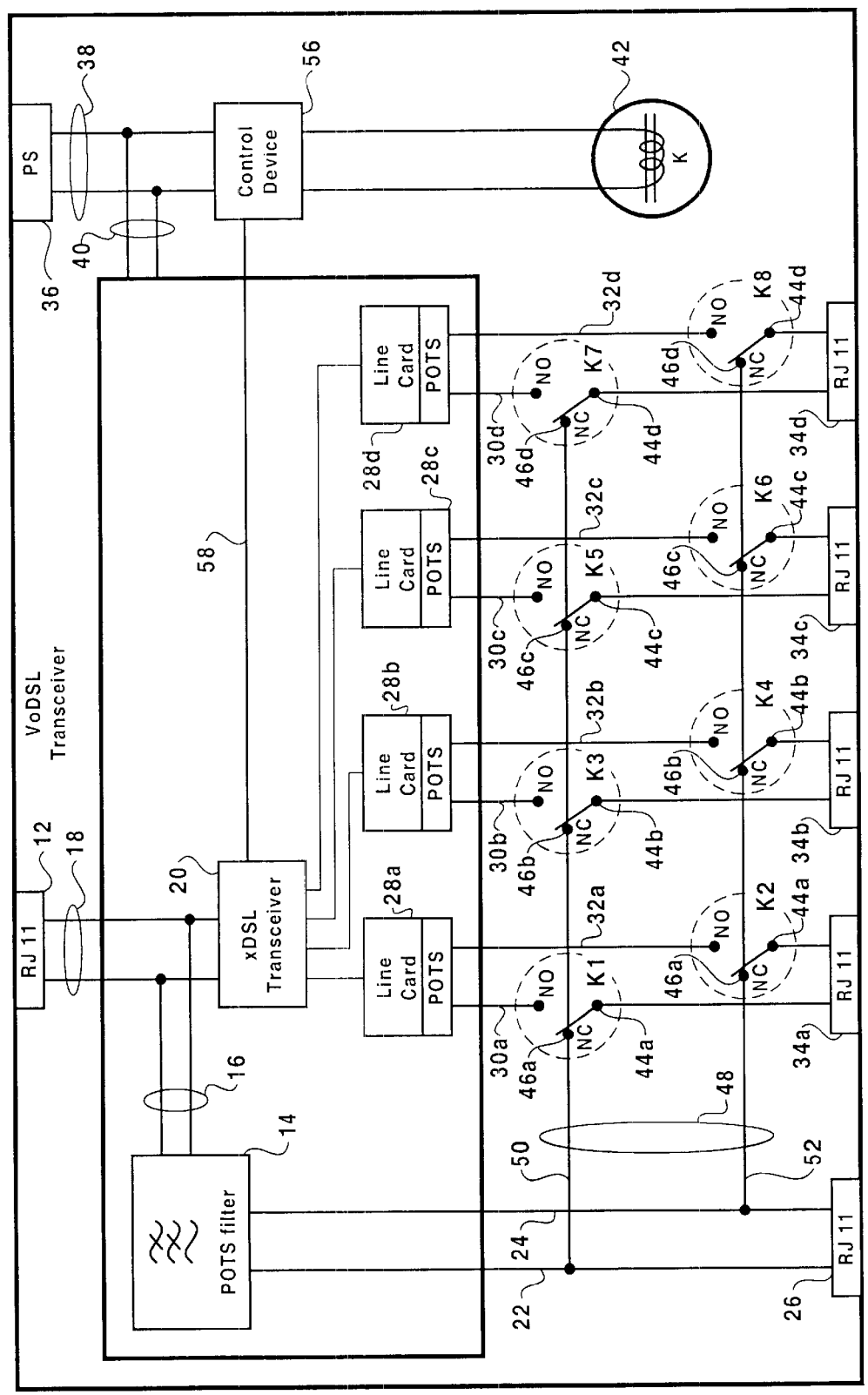
FIG. 1 is a schematic diagram showing a VoDSL transceiver in accordance with a preferred embodiment of the invention during power interruption conditions.

A VoDSL transceiver 10 in accordance with a preferred embodiment of the invention is schematically illustrated in FIG. 1. The VoDSL transceiver is shown in power interruption mode. The VoDSL transceiver 10 normally draws operating power from a customer's premises. Communications payload is exchanged between the VoDSL transceiver 10 and a servicing central office (not shown) via a connector 12 to which a subscriber loop is connected. Received communications signals are routed to a POTS filter 14 via internal connections 16 and to an xDSL transceiver 20 via internal connections 18. The POTS filter 14, also commonly referred to as a "splitter", reduces noise induced by the wideband channel. The POTS filter is optional and may not be included in the VoDSL transceiver 10, in which case the tip and ring pair 22, 24 are directly connected to the internal connections 16. A telephone (not shown) is connected to the legacy POTS termination via telephone interface 26, typically an RJ11 standard connector.

In the embodiment of the VoDSL transceiver shown in FIG. 1, four line cards 28 provide telephone line terminations 34a–d derived from the DSL service channel. A person skilled in the art will appreciate that the VoDSL transceiver 10 can support a number of telephone line terminations limited only by a bandwidth of the DSL service channel and multiplexing efficiency of the DSL receiver. VoDSL derived telephone line terminations also provide tip and ring conductors 30a–d and 32a–d, respectively. The customer can access the VoDSL derived telephone line terminations via telephone interfaces 34a–d to which telephone sets (not shown) may be connected. Under normal operating conditions, each of the telephone line interfaces 26, 34a–d are adapted to support a variety of telephony interfaces that are known standards in the art. Consequently, the customer cannot distinguish between telephone sets connected to the two types of telephone lines (wire loop and VoDSL derived).

Power is provided to the VoDSL transceiver 20 and therefore to the line cards 28 and from a power connector 36 via power conductors 38 and 40. Power conductors 38 also provide operating power to a switchover circuit 42, for example a coil of a relay. A power supply (not shown) for the VoDSL transceiver 20 may be internal or external to the transceiver.

The VoDSL transceiver 10 shown in FIG. 1 is operating under power interruption conditions at the customer's premises. Switchover circuit 42 is de-energized during periods that power is unavailable from power connector 36. The switchover circuit 42 has centre leads 44a–d that correspond to each of the tip and ring conductors 30a–d and 32a–d. Under power interruption conditions, the centre leads 44a–d are normally-closed width leads 46a–d, respectively. In this state, all tip and ring leads associated with the telephone interfaces 34a–d are connected to a tip and ring bus 48 formed by conductors 50 and 52, as shown in FIG. 1. The tip and ring bus 48 is derived from the tip and ring leads 22 and 24 associated with the wire loop termination. Under power interruption conditions, telephone interfaces 26 and 34a–d are connected in parallel.

In an emergency situation in which power is interrupted at the customer's premises, the VoDSL transceiver 10 in accordance with the invention has the following characteristics: all telephone sets connected to VoDSL derived telephone line terminations via connectors 34a–d are automatically coupled to the wire loop termination. This provides a customer with access to lifeline services available on the PSTN from any of the telephone sets by making the wire loop termination available to all telephone sets. Thus the VoDSL connected telephone sets behave as extension telephones on the wire loop termination.

Out-of-box characteristics of the VoDSL transceiver 10, as enabled by the invention, are such that all connected telephone sets are operational—albeit sharing the wire loop termination—in the event of improper installation or configuration of the VoDSL transceiver 10 or improper provision of power to the VoDSL transceiver.

As an additional feature, the VoDSL transceiver 10 preferably further includes a control device 56 which controls power to the switchover circuit 42. The control device is connected to the xDSL transceiver 20 by a control line 58. The xDSL transceiver uses the control line 58 to control the control device 56 so that power only flows to the switchover circuit 42 under control of the xDSL transceiver 20. The xDSL transceiver is preferably programmed to run a process which enables power to the switchover circuit 42 only when the xDSL transceiver 20 is fully operational and telephone service on the wideband channel is functional. Consequently, if communications on the DSL service channel are lost, the telephone(s) connected to telephone interfaces 34a–d are connected to the tip and ring leads 22, 24, as explained above, even though power to the VoDSL transceiver 10 is not interrupted. Likewise, during a reboot, or other transition from a power interruption to a normal operating condition, the xDSL transceiver 20 interrupts power to the switchover circuit 56 using the control line 58 and the control device 56, until normal operation is restored on the DSL service channel. This ensures that all telephones connected to the VoDSL transceiver 10 are enabled for access to lifeline services at all times.

Figure 2:
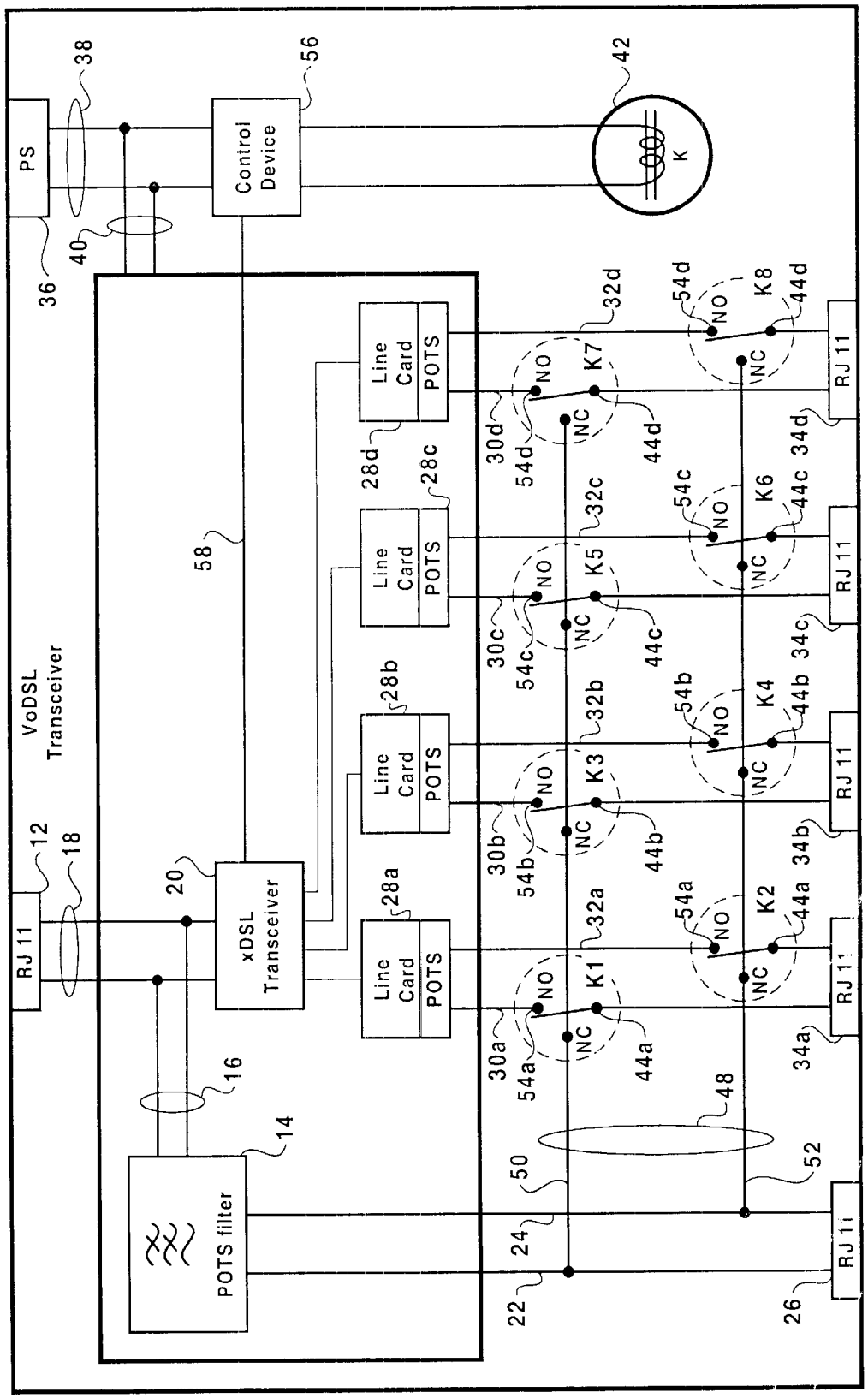
FIG. 2 is a schematic diagram showing the VoDSL transceiver shown in FIG. 1 in a normal operations mode in which operating power is provided to the transceiver.

FIG. 2 shows the VoDSL transceiver 10, according to the invention, under normal operating conditions in which the VoDSL transceiver 10 is provided with operating power. Switchover circuit 42 is energised for as long as power is provided from power supply connector 36. While the switchover circuit 42 is energized, the centre leads 44 maintain the switches 54a–d in their normally-open condition. This provides, under normal operating conditions, connectivity between each line card 28a–d and its respective telephone interface 34a–d.

A person skilled in the art will appreciate that the invention may also be applied to CLE/CPE devices employing VoDSL techniques or CLE/CPE devices which carry voice subchannels over a wideband channel using other protocols such as, but not limited to, frequency division multiplexing, time division multiplexing, code division multiplexing etc., all of which are well known in the art.

Persons skilled in the art will also appreciate that the switchover circuit 42 may be any mechanical or solid state switching device. A relay provides an economical solution for switching all telephone sets associated with the VoDSL derived telephone interfaces over to the wire loop termination. However, there exist a multitude of workable electrical component combinations known in the art for providing reliable switchover circuitry. For example, solid state relays provide one practical alternative for the switchover circuit 42.

Persons skilled in the art will also understand that although the number of telephone interfaces that may be supported by the transceivers in accordance with the invention is limited only by bandwidth and multiplexing efficiency, as described above, there is a practical limit on the number of telephones that can be supported by the wire loop termination for inbound call ringing. Nonetheless, outbound call capability is enabled on all telephones connected to a transceiver in accordance with the invention. As explained above, when power to the transceiver is interrupted, each of the telephones connected to the transceiver perform and behave as extension sets, which are referred to by persons skilled in the art as parallel mode extension telephones.

The embodiment of the invention described above is intended to be exemplary only. The scope of the invention is therefore intended to be limited solely by the scope of the appended claims.

I claim:

1. A transceiver adapted to maintain access to lifeline services in the event of operating power interruption, the transceiver having at least one telephone interface adapted for the connection of a telephone set to a wire loop to provide telephone service and at least one telephone interface adapted for the connection of a telephone set to a telephone service derived from a wideband service channel supported by the wire loop, comprising:

switchover circuitry for disconnecting the at least one telephone interface associated with the wideband service channel from wideband service channel related circuitry in the transceiver in the event of power interruption, and connecting the at least one telephone interface associated with the wideband service channel with the telephone interface connected to the wire loop to enable calls to be completed from any telephone connected to the transceiver during the power interruption; and a control device for controlling the switchover circuitry so that the switchover circuitry connects the at least one telephone interface associated with the wideband service channel with the telephone interface connected to the wire loop whenever telephone service on the wideband service channel is not operational, and further controlling the switchover circuitry so that connection of the telephone sets associated with the service channel to circuits associated with the service channel is only restored when telephone service over the wideband service channel is operational, regardless of when power is restored to the transceiver.

2. A transceiver as claimed in claim 1 wherein the control device is under control of a wideband service transceiver which enables telephone service on lines derived from the wideband service channel.

3. A transceiver as claimed in claim 1, wherein the switchover circuitry comprises:

a biased electrical device, which operates with power from the subscriber's premises, the device being adapted to change from a first state to a second state when powered on and to return to the first state when operating power is interrupted.

4. A transceiver as claimed in claim 3, wherein the biased electrical device comprises a relay.

5. A transceiver as claimed in claim 4, wherein the relay comprises a electromechanical relay.

6. A transceiver as claimed in claim 4, wherein the relay comprises a solid state relay.

7. A transceiver as claimed in claim 1 wherein the transceiver provides a digital subscriber loop (DSL) service.

8. A transceiver as claimed in claim 7 wherein the transceiver is a voice over digital subscriber loop (VoDSL) transceiver.

9. A method of maintaining access to lifeline services during a power interruption to a transceiver having a plurality of telephone set interfaces associated with a service channel that shares a wire loop with a voice channel to provide telephone service, comprising the steps of:

detecting a power interruption condition at the transceiver;

connecting all telephone interfaces associated with the transceiver to the wire loop when the power interruption is detected; and connection of the telephone set interfaces associated with the service channel to circuits associated with the service channel is only restored when telephone service over the wideband service channel is operational, regardless of when power is restored to the transceiver.

10. The method as claimed in claim 9 further comprising a step of:

automatically restoring a connection of the telephone set interfaces associated with the service channel to circuits associated with the service channel when power is restored to the transceiver.

11. A method as claimed in claim 9 wherein the step of detecting comprises changing a state in a switchover circuit when the operating power is interrupted.

12. A method as claimed in claim 11 wherein the change of state is directly induced by the interruption in operating power.

13. A method as claimed in claim 11 wherein the change of state is controlled by a process that monitors the operation of the telephone service on the wideband service channel and the change of state is induced by the process, which controls operating power to the switchover circuit.

14. A method as claimed in claim 9 wherein the transceiver provides a digital subscriber loop (DSL) service.

15. A method as claimed in claim 14 wherein the transceiver is a voice over digital subscriber loop (VoDSL) transceiver.

16. A transceiver adapted to maintain access to lifeline services in the event of operating power interruption, the transceiver having at least one telephone interface adapted for the connection of a telephone set to a wire loop to provide telephone service and at least one telephone interface adapted for the connection of a telephone set to a telephone service derived from a wideband service channel supported by the wire loop, comprising:

means for switching the at least one telephone interface adapted for the connection of a telephone set to a telephone service derived from the wideband service channel to a connection with the wire loop when a supply of operating power to the transceiver is interrupted, so that the at least one telephone interface is supplied with operating power from the wire loop to permit calls to be made from any telephone connected to the at least one interface; and control means for controlling the means for switching to ensure that the means for switching maintains the connection of the telephone set to the telephone service derived from the wideband service channel to a connection with the wire loop whenever the telephone service derived from the wideband service channel is not operational, regardless of when power is restored to the transceiver.

17. A transceiver as claimed in claim 16 wherein the means for switching switches each of the at least one telephone interfaces to the wire loop in parallel when the operating power to the transceiver is interrupted.

18. A transceiver as claimed in claim 16 wherein the at least one telephone interface is automatically switched back to circuits associated with the telephone service derived from the service channel when operating power is restored to the transceiver.

19. A transceiver as claimed in claim 18 wherein the at least one telephone interface is automatically switched back to circuits associated with the telephone service derived from the service channel only after a process operating on the transceiver has established that telephone service on telephone lines derived from the telephone service channel is operational.

20. A transceiver as claimed in claim 16 wherein the means for switching comprises at least one electromechanical relay.

21. A transceiver as claimed in claim 16 wherein the means for switching comprises at least one solid state relay.

22. A transceiver as claimed in claim 16 wherein the transceiver is adapted to provide a digital subscriber loop (DSL) service.

23. A transceiver as claimed in claim 22 wherein the DSL service is a voice over digital subscriber loop (VoDSL).

* * * * *